United States Patent
Mansouri

(10) Patent No.: US 10,933,308 B2
(45) Date of Patent: Mar. 2, 2021

(54) METHOD OF MOTION ANALYSIS FOR A JUGGLING DEVICE

(71) Applicant: FOOTSHAKE, Neuilly-sur-Seine (FR)

(72) Inventor: Moulay Ali Nabil Mansouri, Saint-Cloud (FR)

(73) Assignee: FOOTSHAKE, Neuilly-sur-Seine (FR)

( * ) Notice: Subject to any disclaimer, the term of this patent is extended or adjusted under 35 U.S.C. 154(b) by 3 days.

(21) Appl. No.: 16/342,692

(22) PCT Filed: Oct. 20, 2016

(86) PCT No.: PCT/FR2016/052716
§ 371 (c)(1),
(2) Date: Apr. 17, 2019

(87) PCT Pub. No.: WO2018/073499
PCT Pub. Date: Apr. 26, 2018

(65) Prior Publication Data
US 2020/0047062 A1   Feb. 13, 2020

(51) Int. Cl.
*A63F 13/211* (2014.01)
*A63B 71/06* (2006.01)
*A63B 69/00* (2006.01)
*A63B 43/00* (2006.01)

(52) U.S. Cl.
CPC ........ *A63F 13/211* (2014.09); *A63B 71/0619* (2013.01); *A63B 69/0086* (2013.01); *A63B 2043/001* (2013.01); *A63B 2220/17* (2013.01); *A63F 2300/6045* (2013.01)

(58) Field of Classification Search
CPC .................. A63B 2243/0025; A63F 13/211
See application file for complete search history.

(56) References Cited

U.S. PATENT DOCUMENTS

| | | |
|---|---|---|
| 2012/0258799 A1 | 10/2012 | Jouet et al. |
| 2014/0329622 A1 | 11/2014 | Marshall |
| 2015/0072811 A1 | 3/2015 | Jolliffe |
| 2015/0196811 A1* | 7/2015 | Laurienzo .......... A63B 71/0669 473/570 |
| 2015/0379351 A1* | 12/2015 | Dibenedetto .......... A61B 5/486 345/633 |

FOREIGN PATENT DOCUMENTS

CN    105095644    11/2015

* cited by examiner

*Primary Examiner* — David L Lewis
*Assistant Examiner* — Robert E Mosser
(74) *Attorney, Agent, or Firm* — Duane Morris LLP; Gregory M. Lefkowitz

(57) ABSTRACT

The invention relates to a method of motion analysis for an assembly comprising at least one juggling device, the at least one juggling device 1 comprising a motion analysis module, intended to acquire at least inertial data, the method comprising the following steps:
  a step A of acquiring data, called acquired inertial data, relating to the movements of the at least one juggling device,
  a step B of detecting a bounce, called juggle, of the juggling device on the body of a user on the basis of the acquired inertial data,
  a step C of counting the number of successive juggles of the juggling device.
The invention further relates to a computer program enabling the implementation of such a method and an information storage means comprising instructions for the implementation of such a method.

20 Claims, 1 Drawing Sheet

METHOD OF MOTION ANALYSIS FOR A JUGGLING DEVICE

CROSS-REFERENCE TO RELATED APPLICATIONS

This application is a § 371 national stage entry of International Application No. PCT/FR2016/052716, filed Oct. 20, 2016, the entire contents of which are incorporated herein by reference.

TECHNICAL FIELD OF THE INVENTION

The invention relates to the field of games and physical exercise. In particular, the invention relates to a method of motion analysis for an assembly comprising at least one juggling device.

TECHNICAL BACKGROUND OF THE INVENTION

Connected balls are known, said balls being provided with a sensor enabling the acquisition of data used to measure the speed or acceleration of the balls. These types of balls, in particular enables users to monitor the development of their manner of playing over time. Some of these connected balls also enable monitoring the intensity of one or more training sessions. For example, it is possible to measure the intensity of the throws or hits performed by the user.

However, certain sporting activities mainly rely on technical movements that do not require the analysis of the intensity of throws and hits, but rather of the technical skills involved therein. This is, in particular, the case with juggling, an activity particularly popular among amateur and professional footballers. Current connected balls are not suited to this activity. One of the aims of the invention is to propose a solution that enables monitoring and analysing juggling sessions, so as to be able to assess the technical skills involved, in a fun manner.

BRIEF SUMMARY OF THE INVENTION

For this purpose, the invention proposes a method of motion analysis comprising at least one juggling device, said at least one juggling device comprising a motion analysis module, intended to acquire data, in particular inertial data, the method comprising the following steps:
- a step of acquiring data, called acquired inertial data, relative to the movements of the at least one juggling device,
- a step of detecting a bounce, called juggle, of the juggling device, on the body of a user from acquired inertial data,
- a step of counting the number of successive juggles of the juggling device.

According to the invention, it is in particular possible to assess the juggling skills of the user by measuring the number of successive juggles from the detection of bounces.

According to different aspects of the invention, which can be taken together or individually:
- the method comprises a step of analysing acquired inertial data, the method further comprises a step C' of detecting a fall to the ground of the juggling device and/or the extended immobilisation thereof using the acquired inertial data,
- the method further comprises a step of reinitialising the count when the motion analysis module detects a fall to the ground of the juggling device or the extended immobilisation of the juggling device,
- the at least one juggling device further comprises a data storage means,
- the method further comprises a step D of saving acquired inertial data in the data storage means,
- the juggling device further comprises a data transmission means,
- the method further comprises a step F of transmitting inertial data acquired by the data transmission means towards a receiving module,
- the receiving module is located at a distance from the juggling device,
- the method comprises a step of identifying the movements of the user of a juggling device based on the acquired inertial data,
- the method further comprises a step E of comparing the acquired inertial data with reference data recorded beforehand in order to recognise the specific movements of the juggling device and/or of the user,
- the method comprises a step H of animating a virtual character reproducing the movements of the user and/or of the juggling device,
- the method comprises a step H of animating a virtual character by a computer program reproducing the movements of the user and/or of the juggling device,
- the method comprises at least two juggling devices, the method comprising a step of animating virtual characters reproducing the movements of the user of each juggling device, the animation of each virtual character being displayed on one same display device,
- the method comprises at least two juggling devices, the method comprising a step of comparing the inertial data of each juggling device.

The invention also relates to a computer program comprising instructions for the implementation of each of the steps of the method such as described above, when said program is executed on a computer.

This program can use any programming language, and be in the form of source code, object code, or intermediate code between the source code and the object code, such as in a partially compiled form, or in any other required form.

The invention also aims for a means for storing information, removable or not, partially or fully readable by a computer or a microprocessor comprising the code instructions of a computer program for the execution of each of the steps of the method such as described above.

The information storage means can be any entity or device capable of storing the program. For example, the medium can comprise a storage means, such as a ROM memory (Read-Only Memory), for example a microcircuit ROM, or also a magnetic recording means, for example a hard drive or a flash memory.

Alternatively, the information storage means can be an integrated circuit, wherein the program is incorporated, the circuit being adapted to execute or to be used in the execution of the method in question.

The abovementioned information storage means and computer program feature characteristics and advantages that are similar to the method that they implement.

BRIEF DESCRIPTION OF THE FIGURES

Other characteristics and advantages of the invention will appear upon reading the following detailed description, for the understanding of which, the appended drawings will be referred to, wherein.

DETAILED DESCRIPTION OF AT LEAST ONE EMBODIMENT EXAMPLE OF THE INVENTION

Figure 1:
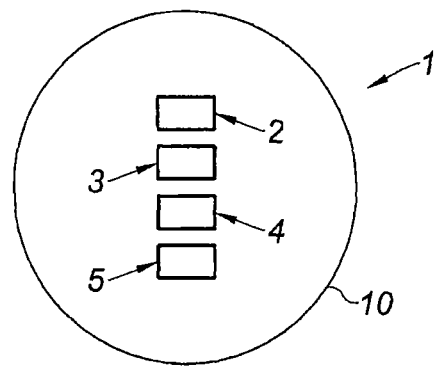
FIG. 1 is a schematic view of an example of a connected ball according to the invention.
Figure 2:
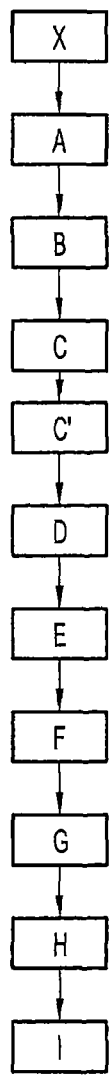
FIG. 2 is a diagram showing a motion analysis method example according to the invention.

The invention relates to a motion analysis method for an assembly comprising at least one juggling device, in particular an interactive juggling device.

The term "juggling device" describes any type of object designed such that a user can juggle with it.

The motion analysis method is in particular designed to enable to count the number of juggles performed by the user with the juggling device 1. Furthermore, the motion analysis method is designed to enable the detection and identification of the movements of the juggling device 1. In addition, the motion analysis method is designed to enable the detection and identification of the movements of the user when they use the juggling device 1.

The juggling device 1 is, for example, a ball with a spherical, ovoid or toroid shape. In particular, it can be a football. Alternatively, the juggling device can be a rugby ball, a handball, or a tennis ball.

Also alternatively, it must be noted, that the juggling device can be a "pitchak" or a similar object, i.e. a ball made of rubber segments. The "pitchak" is used when playing a traditional game of Algerian origin with the same name. This game, which can involve several players, consists of completing a maximum number of juggles.

The juggling device 1 here is a ball that users juggle with their feet, which will be called connected ball 1 below. The connected ball 1 here comprises an outer casing 10 delimiting an inner space of the connected ball 1.

The connected ball here comprises a motion analysis module 2. The motion analysis module 2 here is arranged in the inner space of the connected ball 1.

The motion analysis module 2 here has no freedom of movement with respect to the connected ball 1.

The motion analysis module 2 here is designed to acquire data relating to the movements, in particular inertial data, of the connected ball 1. The analysis module here is a central inertial unit 2. More specifically, the central inertial unit 2 is a central inertial unit with 9 axes. In other words, the motion analysis module 2 serves as a compass, a gyroscope and an accelerometer.

The data, which will be termed acquired inertial data below, provided by the motion analysis module 2, comprises in particular data relating to the position, the speed, the acceleration and the rotation of the connected ball 1.

The method of motion analysis comprises several steps that enable the detection, measurement and analysis of the movements of the connected ball 1 and/or of the movements of the user of the connected ball 1. The motion analysis method in particular comprises the following steps, listed below only by way of an example and in a non-limiting manner, which are not necessarily performed in the following order:
  a step A of acquiring acquired inertial data,
  a step B of detecting a juggle, the juggle consisting of a bounce of the connected ball 1 on the body of the user from the acquired inertial data,
  a step C of counting the number of successive juggles.

The step A here is performed by the central inertial unit 2 of the connected ball 1. The connected ball 1 further comprises a battery 3 connected to the central inertial unit 2 and designed to power the central inertial unit 2. The battery 3 is arranged in the inner space of the connected ball 1. The battery 3 can be integrated and moulded in a casing integrally formed with the central inertial unit 2 without moving away from the scope of the invention.

In addition, the method comprises, for example, an additional detection step, in particular between the acquisition step A and the detection step B, consisting of detecting when the connected ball 1 is set in motion.

The detection step B can simply consist of detecting an impact corresponding to the user kicking the connected ball 1. In particular, the detection step B consists, for example, of detecting an impact corresponding to the user kicking the ball without necessarily comprising the identification of the type of juggle performed.

Alternatively, the detection step B is adapted to enable the identification of the type of juggle performed. In particular, here, step B consists of comparing acquired inertial data with reference data recorded beforehand for various types of juggles. In other words, the purpose of step B is to accurately identify the type of juggle which has been performed with the connected ball 1.

For this purpose, upstream, the motion analysis method comprises a prior calibration step. During this calibration step, test players perform, with the connected ball 1, several specific technical juggling movements, such as juggling the connected ball with the head, shoulder, foot, thigh or any other part of the body.

To further refine the degree of accuracy for the subsequent recognition of movements, it is also possible to consider the impact surface between the body of the user and the connected ball 1, in particular by collecting and processing a "height" parameter, which enables identification of the part of the body the user uses to perform a juggle. For example, when juggling with the feet, it is possible to vary the surface of the body that hits the connected ball 1. Test players can thus perform specific technical movements that are well known to football enthusiasts, such as a kick with the inside of the foot, with the tip of the foot, with the outside of the foot, or with the heel to bounce the connected ball 1 off their bodies.

It must be noted, that test players can also, for each specific technical movement, vary the intensity or effect of the kick, in particular in terms of the rotation they give to the connected ball 1.

Furthermore, it is possible to conduct these tests with test players of different sizes in order to refine the recognition of the movements of the connected ball 1 and of the user, based in particular on the weight and size of the user.

As the test players perform each of the specific technical movements, the signal produced by the central inertial unit 2 of the connected ball 1 is recorded. Each recorded signal is thus associated with said specific technical movement. Thus, the recorded signal will be used to recognise the movement of the connected ball 1. The recorded signal will furthermore be used to recognise the associated technical movement performed by the user and causing the movement of the connected ball 1.

For example, the recorded signal comprises, in particular, speed data that can be measured in $m \cdot s^{-1}$, acceleration data that can be measured in $m \cdot s^{-2}$ and/or angular speed data that can be measured in $radian \cdot s^{-1}$, in particular along three orthogonal axes.

All of the recorded data constitutes reference data with which is compared the acquired inertial data recorded during a phase of use by the user. It must be noted, that the acquired inertial data can be compared in real time or subsequently with the reference data.

The reference data can be stored in a memory directly arranged inside the connected ball. Alternatively, the reference data can be stored remotely, for example on a server, in particular accessible through a smartphone or digital tablet app.

To enable the detection of an immobilisation event of the connected ball 1, or of contact between the connected ball 1 and the ground, the abovementioned reference data can further comprise a recording of signals produced by the central inertial unit when:
the ball is immobilised by the user and/or,
the ball falls to the ground.

It is possible to count the number of successive bounces of the connected ball 1. In particular, the term "bounce" describes the action by the user who hits with a part of their body, the connected ball 1, to make the connected ball 1 bounce off their body. It must be noted, that a hit of the connected ball 1 with a part of the body is considered as a bounce, regardless of whether the part of the body is bare, for example, when juggling with the head, or covered, which can be the case when a user wearing shoes hits the ball with their foot.

By "successive bounces", we mean the number of bounces or juggles performed in succession by the user with the connected ball 1, without the connected ball 1 being immobilised and without the connected ball 1 hitting the ground.

The counting step C thus consists of counting the number of juggles. This step is performed, for example, by incrementing a value n of a counter at each bounce on the body of the user, for example, subject to the following:
that said bounce was preceded by another bounce on the body of the user, and
that no extended immobilisation of the connected ball 1 or contact between the connected ball 1 and the ground between two bounces has been detected.

Thus, the method advantageously comprises an additional detection step C' intended to detect the end of a series of successive bounces on the user. In other words, the method here comprises a step intended to identify when the user ends a series of juggles, either because the connected ball 1 fell to the ground, or because the connected ball 1 was immobilised by the user, for example, with the user's hand. This detection step C' is, for example, performed by comparing the acquired inertial data with the reference data corresponding to this type of event.

The additional detection step C' can, in particular, consist of reinitialising the counting step C, when the motion analysis module 2 detects a fall to the ground of the juggling device 1 or the extended immobilisation thereof.

Furthermore, the method here comprises a step D of saving data. For this purpose, the connected ball comprises a data storage means 4. The data storage means 4 is, for example, arranged in the inner space of the connected ball 1. The data storage means 4 is designed to enable the storage of acquired inertial data acquired by the central inertial unit 2. The data storage means 4 is, for example, a digital data storage unit of the memory card-type. The storage means 4 can be integrated and moulded in a single casing with the central inertial unit 2 and the battery 3 without moving away from the scope of the invention.

The motion analysis method advantageously comprises a step E of comparing the acquired inertial data with the reference data. During the implementation of the motion analysis method, it is thus possible, during this step E, to identify the movements of the ball and/or the technical movements performed by the player.

Here, the motion analysis method can comprise a step F of transmitting the acquired inertial data from the connected ball 1 to a receiver module, in particular located remotely from the connected ball 1.

Advantageously, the connected ball 1 comprises data transmission means 5, here means to transmit the data wirelessly to the receiver module. In particular, the data transmission means 5 are arranged in the inner space of the connected ball 1. They comprise, for example, a Bluetooth® transmitter 5 enabling an exchange of data with the receiver module. Alternatively or in combination, the data transmission means 5 can comprise a Wi-Fi® transmitter and/or 3G or 4G mobile telephone communication means. The transmission means 5 can be integrated and moulded in one single casing with the storage means 4, the central inertial unit 2 and the battery 3 without moving away from the scope of the invention.

The receiver module is here an electronic device. In particular, the receiver module can be, for example, a mobile telephone of the smartphone type.

It must be noted, that the motion analysis method can comprise a step G of pairing or connecting the connected ball 1 with the mobile telephone. This step enables, in particular, to identify the connected ball 1 for which the analysis of the acquired inertial data is required, and establishment of a connection between the telephone and the connected ball 1. This pairing step G can, for example, occur prior to the transmission step F.

It must be noted, that the recording of the data enables its storage in the data storage means 4, in particular for the subsequent transmission thereof with the Bluetooth® 5 transmitter. The data storage means 4 enables, for example, to store acquired inertial data when the connection is not also immediately possible between the connected ball 1 and the telephone.

The data storage means 4, removable or not, can be partially or totally readable by a computer.

The data storage means 4 can be a ROM memory (Read-Only Memory), for example a microcircuit ROM, or a magnetic recording means, for example a hard drive or a flash memory.

Furthermore, the data saving step D allows the user to use the connected ball 1 without necessarily and systematically using their telephone. The user can thus play, for example, for an entire afternoon with the connected ball 1 and connect it to their telephone once they are at home.

In addition, it must be noted, that the step E of comparing the acquired inertial data with the reference data can occur after the data transmission step F.

The motion analysis method can further comprise a step H of animating a virtual character, also called avatar or digital avatar, and a virtual ball.

In particular, the animation step H consists of animating the virtual character by making it reproduce the movements of the user, and simultaneously animating the virtual ball by making it reproduce the movements of the connected ball 1.

Advantageously, the virtual character is configurable and is designed such that the user can create, and modify the character to their image, which enables customising and personalising the playing experience. For example, the user can select the physical appearance and/or clothes of their avatar.

The assembly can comprise several connected balls 1. The connected balls 1 are thus each used by a participant. In this case, the method comprises a step H of animating a virtual character with the virtual ball thereof for each of the participants. The animation of the virtual characters can also be displayed on one same telephone, the screen of which is divided into as many zones as there are participants, for example into two zones or four zones, without these figures being limiting.

Alternatively, a participant can display on their mobile telephone, the avatar animation of another player, so that the participant can compare themselves to the other participants.

The reproduction of the juggling by the avatar can be triggered, directly, or retrospectively. Indeed, the data is stored for a given time, which enables retrospectively repeating the play sequences on the display screen.

The motion analysis method can also comprise a statistical analysis step I in order to deduce, from the acquired inertial data, the statistics relating to the quality and quantity of the juggles performed by the user. The statistical analysis step I can comprise the creation of a graph enabling the user to monitor development over time, for example, over several weeks or months, of their football skills.

As an example, the statistical analysis step I can enable measuring over time, the development of the success rate of the user as they attempt juggles implementing any given technical movement.

It must be noted, that the receiver module is, here, a mobile telephone, but it can also be a digital tablet, a television or a computer. The receiver module can also be a simple display device.

It must be noted, that the motion analysis method can also comprise an initial step X whereby the user provides data relating to their size, in particular so as to improve the recognition of their movements with the connected ball 1, in particular during the comparison step E.

The invention claimed is:

1. Motion analysis method for an assembly comprising at least two juggling devices, the at least two juggling devices comprising a motion analysis module, intended to acquire at least inertial data, the method comprising the following steps:
   a step A of acquiring data, called acquired inertial data, relative to the movements of the at least one juggling device,
   a step B of detecting a bounce, called juggle, of the juggling device on the body of a user from acquired inertial data,
   a step C of counting the number of successive juggles of the juggling device,
   wherein the method further comprises: (i) animating virtual characters reproducing the movements of the users of each juggling device, the animation of each virtual character being displayed on one same display device, (ii) comparing the inertial data of each of the juggling devices, or (iii) both steps (i) and (ii).

2. Motion analysis method according to claim 1, the method comprising a step of (i) animating virtual characters reproducing the movements of the users of each juggling device, the animation of each virtual character being displayed on one same display device.

3. Motion analysis method according to claim 2, further comprising a step C' of detecting a fall to the ground of the juggling device and/or the extended immobilization thereof using the acquired inertial data.

4. Motion analysis method according to claim 3, further comprising a step of reinitializing the count when the motion analysis module detects a fall to the ground of the juggling device or the extended immobilization thereof of the juggling device.

5. Motion analysis method according to claim 2, wherein the at least one juggling device further comprises a data storage means, the method further comprising a step D of saving inertial data in the data storage means.

6. Motion analysis method according to claim 2, wherein the juggling device further comprises a data transmission means, the method further comprising a transmission step F during which the acquired inertial data is transmitted by the data transmission means to a receiver module located remotely from the juggling device.

7. Motion analysis method according to claim 2, further comprising a step of identifying the movements of the user of a juggling device from acquired inertial data.

8. Motion analysis method according to claim 2, further comprising a step E of comparing the acquired inertial data with reference data measured beforehand in order to recognize the specific motion of the juggling device and/or of the user.

9. Motion analysis method according to claim 2, further comprising a step H of animating a virtual character by a computer program reproducing the movements of the user and/or of the juggling device.

10. Motion analysis method according to claim 2, the method comprising a step of (ii) comparing the inertial data of each of the juggling devices.

11. Motion analysis method according to claim 1, the method comprising a step of (ii) comparing the inertial data of each of the juggling devices.

12. Motion analysis method according to claim 11, further comprising a step C' of detecting a fall to the ground of the juggling device and/or the extended immobilization thereof using the acquired inertial data.

13. Motion analysis method according to claim 12, further comprising a step of reinitializing the count when the motion analysis module detects a fall to the ground of the juggling device or the extended immobilization thereof of the juggling device.

14. Motion analysis method according to claim 11, wherein the at least one juggling device further comprises a data storage means, the method further comprising a step D of saving inertial data in the data storage means.

15. Motion analysis method according to claim 11, wherein the juggling device further comprises a data transmission means, the method further comprising a transmission step F during which the acquired inertial data is transmitted by the data transmission means to a receiver module located remotely from the juggling device.

16. Motion analysis method according to claim 11, further comprising a step of identifying the movements of the user of a juggling device from acquired inertial data.

17. Motion analysis method according to claim 11, further comprising a step E of comparing the acquired inertial data with reference data measured beforehand in order to recognize the specific motion of the juggling device and/or of the user.

18. Motion analysis method according to claim 11, further comprising a step H of animating a virtual character by a computer program reproducing the movements of the user and/or of the juggling device.

19. Computer program comprising instructions adapted for the implementation of each of the steps of the method according to claim 1 when said program is executed on a computer.

20. Information storage means, removable or not, partially or fully readable by a computer or a microprocessor comprising code instructions of a computer program for the execution of each of the steps of the method according to claim 1.

\* \* \* \* \*